Dec. 8, 1931.  A. A. AGUEEFF  1,835,740
BRAKE SYSTEM FOR AUTOMOTIVE VEHICLES
Filed Dec. 28, 1927  2 Sheets-Sheet 1
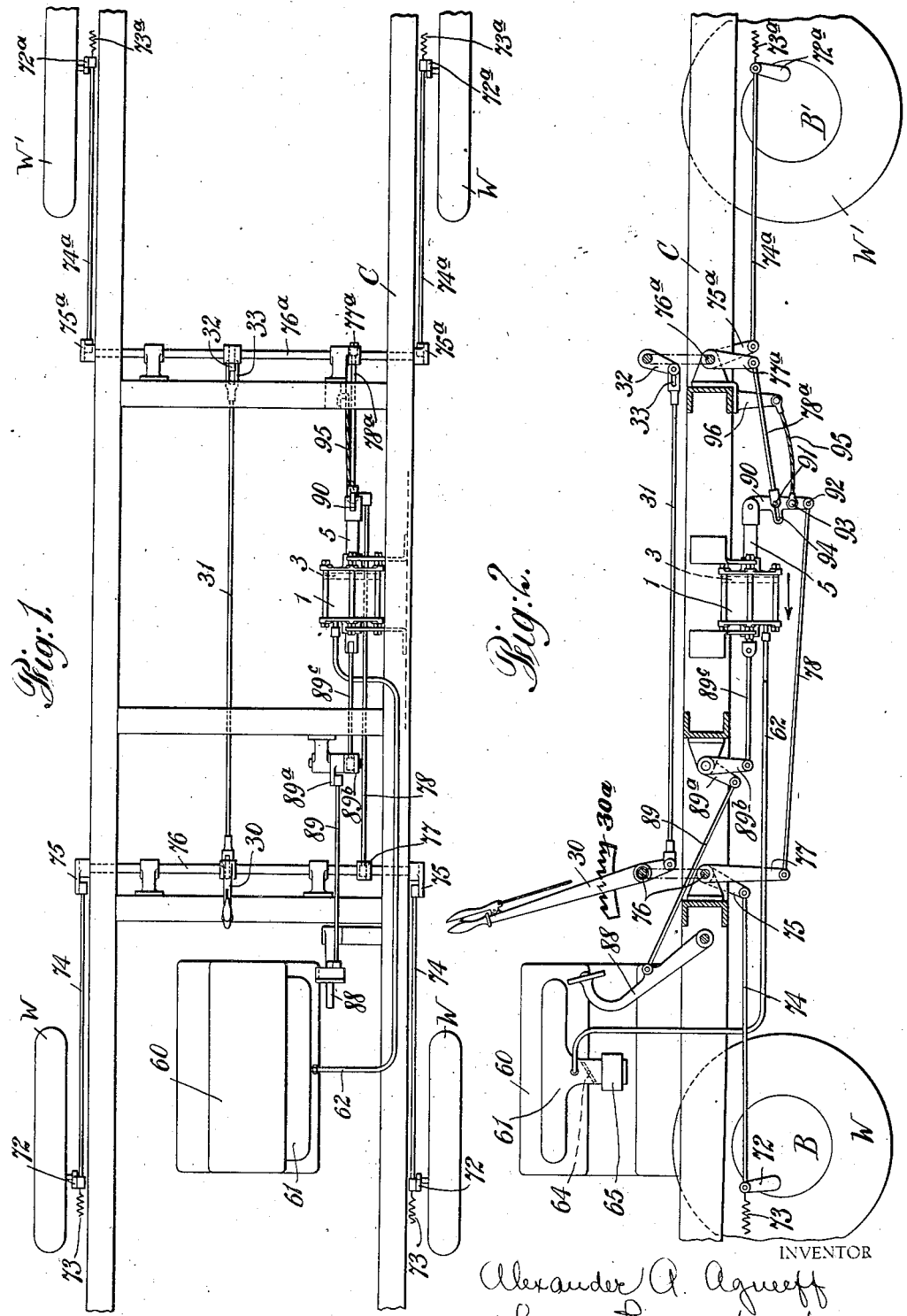
INVENTOR
Alexander A. Agueeff
By Louis Prevost
ATTORNEY

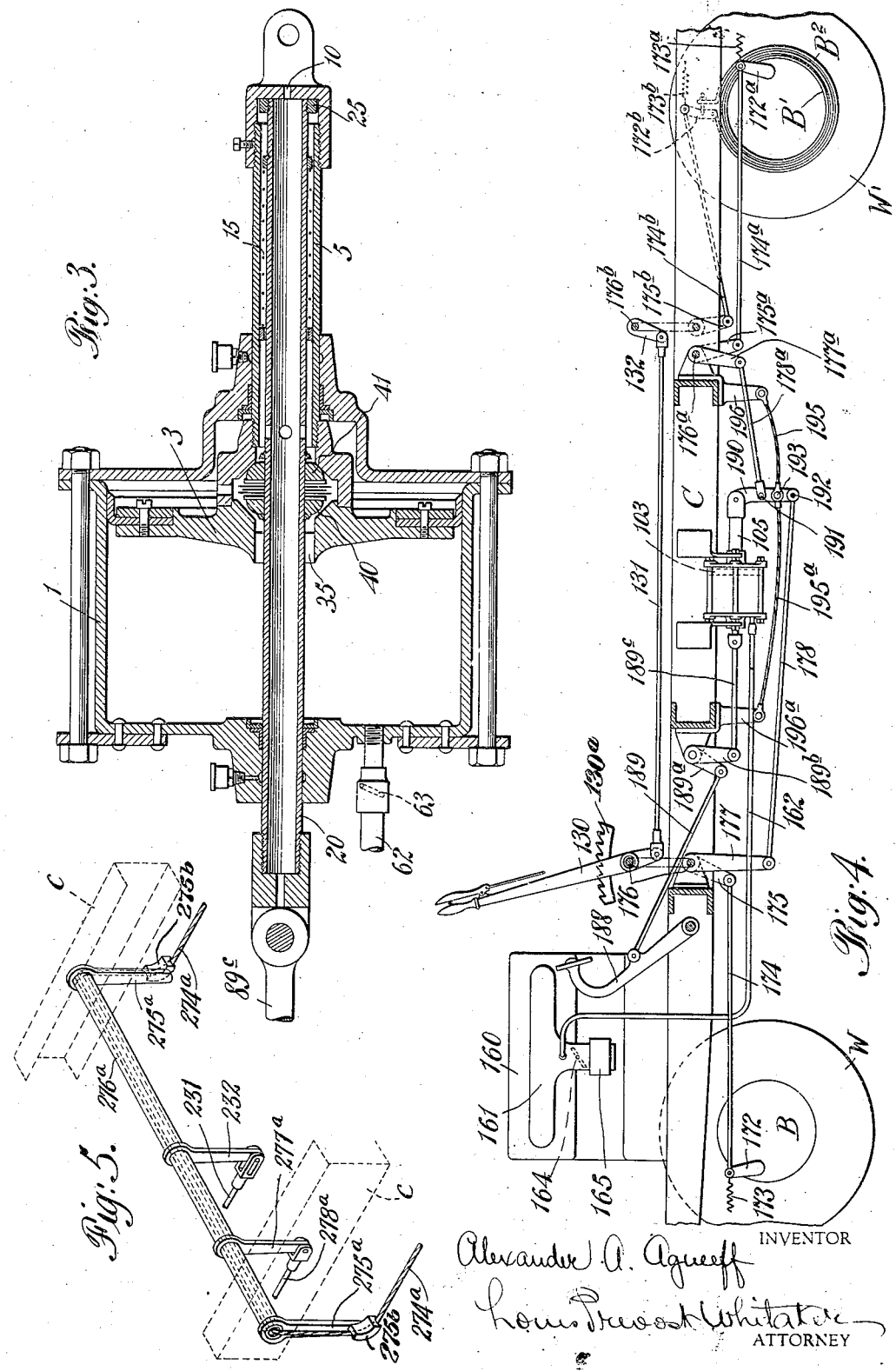

Patented Dec. 8, 1931

1,835,740

UNITED STATES PATENT OFFICE

ALEXANDER A. AGUEEFF, OF FOREST HILLS, NEW YORK, ASSIGNOR TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed December 28, 1927. Serial No. 243,004.

My invention consists in the novel features hereinafter described, reference being had to the accompanying drawings which show two embodiments of my invention selected by me for purposes of illustration, and the said invention is fully disclosed in the following description and claims.

My invention consists in a brake system for automotive vehicles in which a power actuator operated by differential fluid pressures is operatively connected with an equalizing lever, which is in turn independently connected at one point with brake mechanisms for the steering wheels of the vehicle, and at another point with independent brake mechanisms for non-steering wheels of the vehicle in such manner that a power stroke of the power cylinder pulls the connections to said independent brake mechanisms in opposite directions to apply both sets of brake mechanisms simultaneously and distribute the power of the actuator thereto uniformly at all times regardless of the wear of the braking surfaces, a safety connection, or connections, being provided extending from the said equalizing lever preferably at a point between its connections with said separate brake mechanisms, to a stationary point or points on the chassis, so that in case of a rupture or disconnection of the connection between said lever and either of said independent brake mechanisms, the other of said brake mechanisms may be applied by the power of the actuator, my invention also including preferably an emergency brake applying device operatively connected with brake mechanisms for the non-steering wheels, so as to insure the operator's ability to brake the non-steering wheels even though the connections from the equalizing lever to the brake mechanism therefor should become ruptured or disconnected.

In the accompanying drawings,

Fig. 1 represents a diagrammatic plan view of an automotive vehicle provided with a brake system embodying my invention.

Fig. 2 represents a longitudinal section of the same, parts being shown in elevation.

Fig. 3 is a detail view of one form of power actuator which may be employed in carrying out my invention, which is illustrated in elevation in the other figures.

Fig. 4 is a view similar to Fig. 2, showing a slight modification of my invention.

Fig. 5 is a detail view of one form of equalizer which I may employ.

Referring to Figs. 1 and 2, C represents the chassis of an automotive vehicle provided with steering wheels, W, W, and traction or non-steering wheels, $W^1$, $W^1$, each of which is provided with separate brake mechanisms; the front wheel brake mechanisms being indicated at B, and the rear wheel brake mechanisms at $B^1$. The brake mechanisms may be of any desired type, and the particular construction of the brake mechanisms themselves has no bearing on the present invention and will not be particularly illustrated or described. For purposes of explanation, each brake mechanism is shown provided with an operating lever and a retracting spring therefor. The operating levers for the front wheel brakes are indicated at 72, 72, and the retracting springs at 73, 73. The operating levers for the rear wheel brakes are indicated at $72^a$, $72^a$, and the retracting springs at $73^a$, $73^a$. The levers, 72, on the front wheel brakes are connected by links, 74, with arms, 75, on a rock shaft, 76, mounted in the chassis and provided with an operating arm, 77. The levers, $72^a$, are connected by links, $74^a$, with arms, $75^a$, on a rock shaft, $76^a$, mounted in the chassis and provided with an operating arm, $77^a$. 1 represents the cylinder of a power actuator supported in any desired manner from the chassis and having its piston, 3, provided with a piston rod, 5, which is pivotally connected to one end of an equalizing lever, 90. The equalizing lever, 90, is pivotally connected at separated points longitudinally thereof and indicated at 91 and 92, respectively, with a link, $78^a$, connected with the operating arm, $77^a$, and with a link, 78, extending to the operating arm, 77. With this construction it will be seen that a power stroke of the piston of the actuator in the direction of the arrow, Fig. 2, will exert a forward pull on the link, $78^a$, connected with the rear wheel brake mechanisms at a predetermined leverage, and will exert a rearward pull on the link, 78, connected with the front or steering wheel brake mechanisms at a predetermined leverage, and the location of the points of connection, 91 and 92, of said links, and the effective lengths of the respective operating arms, 77ª and 77, are such as to apply the power of the actuator simultaneously to both sets of independent brake mechanisms and to distribute the power of the actuator in a desired and predetermined manner between them, and the effect of this arrangement is to insure the distribution of the power of the actuator uniformly at all times regardless of the wear of the braking surfaces.

In the construction thus far described, it will be obvious that should the link, 78ª, for example, break or become disconnected at either end, the power actuator would be unable to exert any power upon the brake mechanisms for either the steering wheels or the non-steering wheels. To prevent such an occurrence, I provide a safety connection, indicated at 95, extending from a fixed point, as a bracket, 96, connected with the chassis to a point, indicated at 93, on the equalizing lever, which is preferably located between the points of attachment, 91 and 92, of the connecting links, 78ª and 78, at which intermediate point very little movement takes place during a power stroke of the actuator, as will be readily understood, and the safety connection, 95, is so constructed as to provide a sufficient slack or lost motion to accommodate such movement without bringing the safety connection into operation. In the present instance I have shown the safety connection, 95, in the form of a flexible cable extending from bracket, 96, to the equalizing lever at the point, 93, the slack in the cable being somewhat exaggerated in Fig. 2 for greater clearness, as it is only necessary to provide a sufficient amount of lost motion to accommodate the very slight movements of the point, 93, during the normal operation of the apparatus.

It will be understood that the power actuator will be provided with suitable controlling valve mechanism and that it will operate by the differential of fluid pressures on the opposite faces of the piston, which may be provided from any suitable sources of higher and lower fluid pressures. In the present instance I have shown in Fig. 3 an actuator of the kind covered by Letters Patent of the United States, No. 1,583,117, granted to Caleb S. Bragg and Victor W. Kliesrath, May 4, 1926, the specific construction of which, therefore, forms no part of my invention, and it will not be particularly described further than necessary to an understanding of my invention. In this instance the cylinder forward of the piston is connected by a suction pipe, 62, with the suction passage, 61, of the internal combustion engine, 60, which drives the vehicle, between the throttle valve, 64, and the engine cylinders, the suction passage being provided with the usual carburetor, indicated at 65, below the throttle valve. The controlling valve mechanism for the actuator comprises a suction valve, 40, an air inlet valve, 41, in the piston hub for alternately connecting the cylinder in rear of the piston with suction, that is, by connecting it with the cylinder forward of the piston through the passage, 35, in the hub of the piston, and with the atmosphere through an air inlet, 10, at the outer end of the hollow piston rod, 5, the valves being operated by a sleeve, 20, movable with and with respect to the piston and provided with means for limiting the lost motion between the valve actuating sleeve and the piston, comprising in this instance a collar, 25, on the end of the sleeve adapted to engage the rear end of the piston rod, 5, to enable the operator by depressing the operator operated part, or pedal lever, 88, which is connected to the valve actuating sleeve, sufficiently to take up this lost motion and apply his physical force directly to the piston and through it to the brake mechanisms connected therewith, in addition to the power exerted by the actuator, or for the purpose of shifting the valve mechanism into position to vent the cylinder and applying the brake mechanisms by physical force alone. In the present instance the pedal lever, 88, is connected by means of link, 89, arms, 89ª and 89ᵇ, and link, 89ᶜ, with the valve actuating sleeve. The pedal lever, 88, is desirably provided with a suitable retracting spring, which in this instance is in the form of a spiral spring 15 interposed between the sleeve, 20, and the hollow piston rod, 5, but which may be applied to the foot pedal in any other desired manner.

30 represents an emergency brake lever, which in this instance is loosely pivoted on the shaft, 76, and is connected by a link, 31, with brake mechanism for the rear or non-steering wheels. It will be understood that this emergency brake lever may be connected with an entirely different set of brake mechanisms for the non-steering wheels from the brake mechanisms, B¹, B¹, to which the actuator is connected, or to the said brake mechanisms, and for simplicity of explanation I have shown the link, 31, connected to an arm, 32, on the shaft, 76ª, to enable the emergency brake lever to operate the rear wheel brake mechanisms, B¹, B¹. A slot, 33, is provided in the link, 31, to permit the operation of the rear wheel brake mechanisms by the power actuator without moving the emergency brake lever, 30. This is important, as in the absence of this slot, 33, or equivalent provision for lost motion between the emergency brake lever and the brake mechanism connected therewith the application of the brakes by the actuator would operate the emergency brake lever, and as it is ordinarily provided with a locking segment 30ª and pawl the brakes would be held applied. Where this arrangement is employed, the equalizing lever, 90, is also provided with a slot, 94, engaged by a pin, 91, connecting said lever with the link, 78ª, to permit the operation of the rear wheel brakes alone by the emergency brake lever, 30, when this may be or become desirable.

Assuming that the engine is in operation so as to provide the necessary suction as the source of lower pressure, if the operator depresses the pedal levers, 88, sufficiently to shift the valve mechanism of the actuator into position to produce a power stroke of the actuator piston, the brake mechanisms for the steering wheels and those for the non-steering wheels will be simultaneously applied through the equalizing lever, 90, which will pull the link, 78ª, forward, and the link, 78, rearward, the power of the actuator being distributed to the independent sets of brake mechanisms uniformly at all times regardless of wear of the braking surfaces. As soon as the forward movement of the pedal lever ceases, the slight continued forward movement of the piston causes it to overtake the valve actuating sleeve and shift the valve mechanism into position to hold the brakes as applied, and the release of the foot lever will permit the valve mechanism to be shifted under the action of the retracting spring, 15, to effect the release of all the brake mechanisms and their return to normal position under the action of their retracting springs, 73 and 73ª. The slack or lost motion provided in the safety connection will accommodate the slight movement of the point of connection, 93, as before stated, without drawing the said connections taut, or interfering in any way with the simultaneous application of all the brake mechanisms, and will also accommodate the slight variations in the range of movement of the equalizing lever, which may be produced in case the braking surfaces of the rear wheel brakes should wear away more rapidly than those of the front wheel brakes, or vice versa. If the link, 78ª, should become disconnected at either end or break, the operation of the power actuator would draw the upper end of the equalizing lever, 90, forward, without operating either of the independent brake mechanisms until the safety connection, 95, becomes taut, when the further movement of the actuator piston will apply the power of the actuator to the front wheel brake mechanisms at a greater leverage than normally, as the distance from the connection between the equalizing lever and the piston rod, 5, and the point, 93,—(which becomes the fulcrum of the equalizing lever, as soon as the safety connection is taut) is greater than the distance between said connection and the point, 91, so that the front wheel brakes will be applied with greater force than normally, by the power actuator. The rear wheel brakes will not be applied by the power actuator under the circumstances mentioned, but the emergency lever, 30, may be operated to apply the rear wheel brake mechanisms independently of the actuator so that the brake mechanisms for all four wheels of the vehicle, including the steering wheels and the non-steering wheels, may be applied by the operator.

In the construction herein shown and described, I have not illustrated any equalizing means between the separate brake mechanisms for the rear wheels, or the separate brake mechanisms for the front wheels, and therefore, should one of the links, 74ª, connecting one rear brake mechanism with the cross shaft become broken or disconnected, the other brake connected with said cross shaft will be applied with double force without materially changing the amount of travel of the equalizing lever or calling the safety connection into operation. Where an equalizing device is provided between the brake mechanisms for the rear wheels, it is obvious that the breaking of the connection therefrom to one of the brake mechanisms for a rear wheel would have the same effect as the braking or disconnection of the link, 78ª, and in this case the safety connection would be called into operation, and the power actuator would apply only the brake mechanisms for the front or steering wheels. In such a situation the emergency brake lever would be effective to apply the rear wheel brake mechanisms if connected with a separate pair of rear wheel brake mechanisms, as is customary in automotive vehicle structure, but this is so obvious that I have not illustrated such independent emergency brake mechanisms in Figs. 1 and 2. I have, however, illustrated such emergency brake mechanisms connected with the emergency brake lever in Fig. 4.

In Fig. 4 I have illustrated a slight modification of my invention in which the parts corresponding to those in Figs. 1, 2 and 3 and previously described, are given the same reference numerals with the addition of 100 to avoid repetition. The construction of the brake system shown in Fig. 4 is identical with that previously described both in construction and operation, except for the following particulars. In this instance I have shown a second safety connection, 195ª, extending from the point, 193, on the equalizing lever, 190, to a fixed point on a second bracket, 196ª, secured to the chassis forward of the lever, 190, so that should the connecting link rod, 178, extending from the equalizing lever to the brake mechanisms, B, B, for the front or steering wheels break or become disconnected, the operation of the actuator will have the effect of taking up the slack or lost motion provided in the safety connection, 195ª, and therefore applying the brake mechanisms, B¹, for the rear or non-steering wheels with increased power, as the fulcrum for the equalizing lever, with respect to the rear wheel brake mechanisms, will be transferred from the point, 192, to the point, 193, thus increasing the leverage of the equalizing lever in the application of the rear wheel brakes. In this case, however, there would be no means for applying the brake mechanisms to the front wheels, but the presence of the safety connection, 195ª, may well serve to avoid an accident, which might otherwise result, although even without the additional safety connection, 195ª, brake mechanisms for the rear wheels may be applied by means of the emergency brake lever, 130.

In this instance I have shown diagrammatically the rear wheels provided with additional emergency brake mechanisms, B², the operating lever therefor being indicated at 172ᵇ, and the retracting spring therefor at 173ᵇ, the said emergency brake operating levers being connected by independent links, 174ᵇ, with operating arms, 175ᵇ, on an independent rock shaft, 176ª, to which the arm, 132, is connected, said arm being connected by the link, 131, with the emergency brake lever, 130. In this construction, should the connecting link, 178ª, break or become disconnected, or should one of the connecting links, 174ª, break or become disconnected where an equalizing device is employed for the main rear wheel brake mechanisms, B¹, the safety connection, 195, would be brought into operation to insure the application of the front wheel brakes by the power actuator in the manner previously described with reference to Figs. 1 and 2, while the emergency brake lever, 130, could be operated to apply the separate emergency brake mechanism, B², for the rear wheels with the same results previously described with reference to Figs. 1 and 2.

In Fig. 5 I have shown in detail a very simple form of equalizing device for connecting the rock shaft for the rear wheel brakes with the brake mechanism thereof. In this instance the rock shaft, 276ª, is hollow, and a flexible cable, 274ª, extends therethrough and around curved guiding portions, 275ᵇ, on the arms, 275ª, and have their ends connected with the respective brake mechanisms for the rear or non-steering wheels. The shaft is provided with the actuating arm, 277ª, to which the actuator is connected, and an arm, 232, to which the hand operated lever is connected by link, 231. The cable is free to move through the shaft, 276ª, and acts as an equalizer in transmitting power from the said shaft to the brake mechanisms, B¹, B¹. This particular form of equalizer is not a part of my invention and any other form of equalizer may be employed.

It is also to be understood that while I have shown the safety connections in the form of flexible cables, the lever arm may be connected to the frame or chassis by other means containing a provision for lost motion, within the scope of my invention.

What I claim and desire to secure by Letters Patent is:—

1. In a brake system for automotive vehicles, the combination with brake mechanisms for a pair of wheels of the vehicle, and independent brake mechanisms for another pair of wheels of the vehicle, of a power actuator comprising a cylinder, a piston, and controlling valve mechanism therefor, and means for subjecting said piston to a differential of fluid pressures on its opposite faces under the control of said valve mechanism, an equalizing lever connected with the actuator piston, independent connections from said lever at different points longitudinally thereof to said independent brake mechanisms respectively, for operating all of said brake mechanisms simultaneously, and distributing the power of the actuator to the brake mechanisms for said respective pairs of wheels uniformly at all times regardless of the wear of the braking surfaces, and a safety connection from a point in said equalizing lever to a point fixed with respect to the vehicle, said connection providing a sufficient amount of lost motion to accommodate the normal movement of said equalizing lever at its point of connection therewith.

2. In a brake system for automotive vehicles, the combination with brake mechanisms for a pair of wheels of the vehicle, and independent brake mechanisms for another pair of wheels of the vehicle, of a power actuator comprising a cylinder, a piston, and controlling valve mechanism therefor, and means for subjecting said piston to a differential of fluid pressures on its opposite faces under the control of said valve mechanism, an equalizing lever connected with the actuator piston, independent connections from said lever at different points longitudinally thereof to said independent brake mechanisms respectively, for operating all of said brake mechanisms simultaneously, and distributing the power of the actuator to the brake mechanisms for said respective pairs of wheels uniformly at all times regardless of the wear of the braking surfaces, and a safety connection from a point in said equalizing lever between its points of connection with said respective independent brake mechanisms, to a point fixed with respect to the vehicle, said safety connection providing a sufficient amount of lost motion to accommodate the normal movement of said equalizing lever at its point of connection therewith.

3. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms at all times, and a safety connection from a point in said equalizing lever to a point fixed with respect to the vehicle, said safety connection being constructed to provide sufficient lost motion to accommodate the normal movements of said lever at its point of connection therewith, whereby in case of the rupture or disconnection of the connections from said lever to the brake mechanisms for the non-steering wheels, the brake mechanisms for the steering wheels may be applied by the power actuator.

4. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection from a point in said equalizing lever between its point of connection with said independent brake mechanisms, to a point fixed with respect to the vehicle, said safety connection providing sufficient lost motion to accommodate the normal movement of said lever at its point of connection therewith, whereby in case of the rupture or disconnection of the connections between the said lever and the brake mechanisms for the non-steering wheels, the brake mechanisms for the steering wheels may be applied by the actuator at increased leverage.

5. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection from a point in said equalizing lever to a point fixed with respect to the vehicle, said safety connection being constructed to provide sufficient lost motion to accommodate the normal movements of said lever at its point of connection therewith, whereby in case of the rupture or disconnection of the connections from said lever to the brake mechanisms for the non-steering wheels, the brake mechanisms for the steering wheels may be applied by the power actuator.

6. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection from a point in said equalizing lever between its point of connection with said independent brake mechanisms, to a point fixed with respect to the vehicle, said safety connection providing sufficient lost motion to accommodate the normal movement of said lever at its point of connection therewith, whereby in case of the rupture or disconnection of the connections between the said lever and the brake mechanisms for the non-steering wheels, the brake mechanisms for the steering wheels may be applied by the actuator at increased leverage.

7. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection from a point in said equalizing lever to a point fixed with respect to the vehicle, said safety connection being constructed to provide sufficient lost motion to accommodate the normal movements of said lever at its point of connection therewith, whereby in case of the rupture or disconnection of the connections from said lever to the brake mechanisms for the non-steering wheels, the brake mechanisms for the steering wheels may be applied by the power actuator, an operator operated device connected with said controlling valve mechanism for the actuator.

8. In a brake system for automotive vehicles, the combination with brake mechanisms for the steering wheels of the vehicle, and independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston and with said valve mechanism, connections from points on said lever separated longitudinally from each other, in opposite directions to said respective brake mechanisms for applying the brake mechanisms of said steering and non-steering wheels simultaneously and distributing the power of the actuator between said respective brake mechanisms uniformly at all times, and a safety connection from a point in said equalizing lever to a point fixed with respect to the vehicle, said safety connection being constructed to provide sufficient lost motion to accommodate the normal movements of said lever at its point of connection therewith, whereby in case of the rupture or disconnection of the connections from said lever to the brake mechanisms for the non-steering wheels, the brake mechanisms for the steering wheels may be applied by the power actuator, an operator operated device connected with said controlling valve mechanism for the actuator, and connected with the brake mechanisms operating by the power actuator by means permitting lost motion for the operation of said valve mechanism, whereby the operator may apply his physical force to the brake mechanisms operatively connected with said power actuator.

9. In a brake system for automotive vehicles, the combination with a pair of brake mechanisms for the steering wheels of the vehicle, and a pair of independent brake mechanisms for the non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanism for applying all of said brake mechanisms simultaneously and distributing the power of the actuator between said respective pairs of brake mechanisms uniformly at all times, and a safety connection from a point in said equalizing lever between its point of connection with said independent brake mechanisms to a point fixed with respect to the vehicle, and extending in the same direction from said lever as the connection therefrom to the brake mechanisms for the non-steering wheels, said safety connection providing sufficient lost motion to accommodate the normal movement of said lever at its point of connection therewith, whereby in case of the rupture or disconnection of the connection between the said lever and the brake mechanisms for the non-steering wheels, the brake mechanisms for the steering wheels may be applied by the actuator at increased leverage, and an operator operated device connected with the controlling valve mechanism for the actuator.

10. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, and an equalizing lever connected with the piston and with said valve mechanism, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection from a point in said equalizing lever between its point of connection with said independent brake mechanisms, to a point fixed with respect to the vehicle, and extending in the same direction from said lever as the connection therefrom to the brake mechanisms for the non-steering wheels, said safety connection providing sufficient lost motion to accommodate the normal movement of said lever at its point of connection therewith, whereby in case of the rupture or disconnection of the connection between the said lever and the brake mechanisms for the non-steering wheels, the brake mechanisms for the steering wheels may be applied by the actuator at increased leverage, an operator operated device connected with the controlling valve mechanism for the actuator, by means permitting lost motion for the operation of said valve mechanism, whereby the operator may apply his physical force to the brake mechanisms operatively connected with said power actuator.

11. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, a safety connection extending from a point in said equalizing lever to a point fixed with respect to the vehicle, and in the same direction from said lever as the connection to the brake mechanisms for the non-steering wheels, a second safety connection extending from a point in the equalizing lever to a point fixed with respect to the vehicle and in a direction corresponding with that of the connection from the equalizing lever to the brake mechanisms for the steering wheels, said safety connections each being constructed to provide sufficient lost motion to acommodate the normal movements of the equalizing levers at their points of connection therewith, and an operator operated part connected with said valve mechanism.

12. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, a safety connection extending from a point in said equalizing lever to a point fixed with respect to the vehicle, and in the same direction from said lever as the connection to the brake mechanisms for the non-steering wheels, a second safety connection extending from a point in the equalizing lever to a point fixed with respect to the vehicle and in a direction corresponding with that of the connection from the equalizing lever to the brake mechanisms for the steering wheels, said safety connections each being constructed to provide sufficient lost motion to accommodate the normal movements of the equalizing lever at their points of connection therewith, the points of connection between each of said safety connections and the equalizing lever being located between the points of connection of said lever with the brake mechanisms for the steering and non-steering wheels, whereby in case of rupture or disconnection of the connections between the said lever and the brake mechanisms for either the steering or non-steering wheels, the brake mechanisms for the other of said wheels may be applied by the power actuator with increased leverage.

13. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston and with said valve mechanism, connections from points on said lever separated longitudinally from each other in opposite directions to said respective pairs of brake mechanisms for applying all of said brake mechanisms simultaneously and distributing the power of the actuator between said respective pairs of brake mechanisms uniformly at all times, a safety connection extending from a point in said equalizing lever to a point fixed with respect to the vehicle, and in the same direction from said lever as the connection to the brake mechanisms for the non-steering wheels, a second safety connection extending from a point in the equalizing lever to a point fixed with respect to the vehicle and in a direction corresponding with that of the connection from the equalizing lever to the brake mechanisms for the steering wheels, said safety connections each being constructed to provide sufficient lost motion to accommodate the normal movements of the equalizing lever at their points of connection therewith, the points of connection between said safety connections and the equalizing lever being located between the points of connection of said lever with the brake mechanisms for the steering and non-steering wheels, and an operator operated part connected with said controlling valve mechanism and connected with the piston of the actuator, by means permitting lost motion for the operation of said valve mechanism, to enable the operator to apply his physical force to the equalizing lever and brake mechanisms connected therewith, in addition to that of the actuator or in case of failure of power, whereby in case of rupture or disconnection of the connections between the said lever and the brake mechanisms for either the steering or non-steering wheels, the brake mechanisms for the other of said wheels may be applied by the power actuator, the physical force of the operator, or both, with increased leverage.

14. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston and with said valve mechanism, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, a safety connection extending from a point in said equalizing lever to a point fixed with respect to the vehicle, and in the same direction from said lever as the connection to the brake mechanisms for the non-steering wheels, a second safety connection extending from a point in the equalizing lever to a point fixed with respect to the vehicle and in a direction corresponding with that of the connection from the equalizing lever to the brake mechanisms for the steering wheels, said safety connections each being constructed to provide sufficient lost motion to accommodate the normal movements of the equalizing lever at their points of connection therewith, the points of connection between each of said safety connections and the equalizing lever being located between the points of connection of said lever with the brake mechanisms for the steering and non-steering wheels, an operator operated part connected to said controlling valve mechanism for the actuator and connected to the actuator piston, by means providing lost motion for the operation of said valve mechanism to enable the operator to apply his physical force to the equalizing lever and brake mechanisms connected therewith in addition to that of the actuator or in case of failure of power, whereby in case of rupture or disconnection of the connections between said lever and the brake mechanisms for either the steering or non-steering wheels, the brake mechanisms for the other of said wheels may be applied by the power actuator, the physical force of the operator, or both, with increased leverage.

15. In a brake system for automotive vehicles, the combination with a pair of brake mechanisms for the steering whels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection extending from a point in said equalizing lever to a point fixed with respect to the vehicle, and in the same direction from said lever as the connection to the brake mechanisms for the non-steering wheels, said safety connection being constructed to provide sufficient lost motion to accommodate the normal movements of said lever at its point of connection therewith, whereby in case of the rupture or disconnection of the connection from said lever to the brake mechanisms for the non-steering wheels, the brake mechanisms for the steering wheels may be applied by the power actuator, and an operator operated part operatively connected with said valve mechanism and operatively connected with the equalizing lever, by means providing lost motion sufficient to insure the operation of the valve mechanism, whereby the physical force of the operator may be applied to said equalizing lever in addition to the power of the actuator, and to operate the valve mechanism to vent the actuator cylinder and apply the brake mechanisms connected with said equalizing lever in case of failure of power.

16. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection extending from a point in said equalizing lever to a point fixed with respect to the vehicle, and in the same direction from said lever as the connection to the brake mechanisms for the non-steering wheels, said safety connection being constructed to provide sufficient lost motion to accommodate the normal movements of said lever at its point of connection therewith, the point of connection between said safety connection and the equalizing lever being located between the points of connection of said lever with the brake mechanisms for the steering and non-steering wheels, whereby in case of the rupture or disconnection of the connection from said lever to the brake mechanisms for the non-steering wheels, the brake mechanisms for the steering wheels may be applied by the power actuator with increased leverage.

17. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection extending from a point in said equalizing lever to a point fixed with respect to the vehicle, and in the same direction from said lever as the connection to the brake mechanisms for the non-steering wheels, said safety connection being constructed to provide sufficient lost motion to accommodate the normal movements of said lever at its point of connection therewith, the point of connection between said safety connection and the equalizing lever being located between the point of connection of said lever with the brake mechanisms for the steering and non-steering wheels, whereby in case of the rupture or disconnection of the connection from said lever to the brake mechanisms for the non-steering wheels, the brake mechanisms for the steering wheels may be applied by the power actuator with increased leverage.

18. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanisms, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection extending from a point in said equalizing lever to a point fixed with respect to the vehicle, and in the same direction from said lever as the connection to the brake mechanisms for the non-steering wheels, and a second safety connection extending from a point in the equalizing lever to a point fixed with respect to the vehicle, and in the same direction from said lever as the connection to the brake mechanisms for the non-steering wheels, and a second safety connection extending from a point in the equalizing lever to a point fixed with respect to the vehicle and in a direction corresponding with that of the connection from the equalizing lever to the brake mechanisms for the steering wheels, said safety connections being constructed to provide sufficient lost motion to accommodate the normal movements of the equalizing lever at its point of connection therewith, and an operator operated part connected with said valve mechanism and operatively connected with said equalizing lever, by means providing lost motion to insure the operation of the valve mechanism, whereby the operator may add his physical force to the brake mechanisms operatively connected with said valve mechanism.

19. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a safety connection extending from a point in said equalizing lever to a point fixed with respect to the vehicle, and in the same direction from said lever as the connection to the brake mechanisms for the non-steering wheels, and a second safety connection extending from a point in the equalizing lever to a point fixed with respect to the vehicle and in a direction corresponding with that of the connection from the equalizing lever to the brake mechanisms for the steering wheels, said safety connections each being constructed to provide sufficient lost motion to accommodate the normal movements of the equalizing levers at their points of connection therewith, the points of connection between each of said safety connections and the equalizing lever being located between the points of connection of said lever with the brake mechanisms for the steering and non-steering wheels, whereby in case of rupture or disconnection of the connections between the said lever and the brake mechanisms for either the steering or non-steering wheels, the brake mechanisms for the other of said wheels may be applied by the power actuator with increased leverage, and an operator operated part connected with said valve mechanism and operatively connected with said equalizing lever, by means providing sufficient lost motion to insure the operation of the valve mechanism, whereby the operator may add his physical force to the brake mechanisms operatively connected with said valve mechanism.

20. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a flexible safety connection from a point in said equalizing lever to a point fixed with respect to the vehicle and located to the rear of the equalizing lever, said safety connection being constructed to provide sufficient lost motion to accommodate the normal movements of said lever at its point of connection therewith, whereby in case of the rupture or disconnection of the connection from said lever to the brake mechanisms for the non-steering wheels, the brake mechanisms for the steering wheels may be applied by the power actuator.

21. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a flexible safety connection from a point in said equalizing lever between its point of connection with said independent brake mechanisms, to a point fixed with respect to the vehicle and located to the rear of said lever, said safety connection providing sufficient lost motion to accommodate the normal movement of said lever at its point of connection therewhereby in case of the rupture or disconnection of the connection between the said lever and the brake mechanisms for the non-steering wheels, the brake mechanisms for the steering wheels may be applied by the actuator at increased leverage.

22. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a flexible safety connection extending from a point in said equalizing lever to a point fixed with respect to the vehicle and located forward of said lever, said safety connection being constructed to provide sufficient lost motion to accommodate the normal movements of said lever at its point of connection therewith, whereby in case of the rupture or disconnection of the connection from said lever to the brake mechanisms for the steering wheels, the brake mechanisms for the non-steering wheels may be applied by the power actuator.

23. In a brake system for automotive vehicles, the combination with a pair of brake mechanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a flexible safety connection extending from a point in said equalizing lever between its point of connection with said independent brake mechanisms, to a point fixed with respect to the vehicle and located forward of said lever, said safety connection providing sufficient lost motion to accommodate the normal movement of said lever at its point of connection therewith, whereby in case of the rupture or disconnection of the connection between the said lever and the brake mechanisms for the steering wheels, the brake mechanisms for the non-steering wheels may be applied by the actuator at increased leverage.

24. In a brake system for automotive vehicles, the combination with a pair of brake mehanisms for the steering wheels of the vehicle, and a pair of independent brake mechanisms for non-steering wheels of the vehicle, of a power actuator comprising a cylinder, a piston therein, and controlling valve mechanism, and means for subjecting the piston to a differential of fluid pressures on its opposite faces under the control of said valve mechanism, an equalizing lever connected with the piston, connections from points on said lever separated longitudinally from each other, in opposite directions to said respective pairs of brake mechanisms for applying all of said brake mechanisms simultaneously and distributing the power of the actuator between said respective pairs of brake mechanisms uniformly at all times, and a flexible safety connection extending from a point in said equalizing lever to a point fixed with respect to the vehicle and located forward of said lever, said safety connection being constructed to provide sufficient lost motion to accommodate the normal movements of said lever at its point of connection therewith, whereby in case of the rupture or disconnection of the connection from said lever to the brake mechanisms for the steering wheels, the brake mechanisms for the non-steering wheels may be applied by the power actuator.

25. In a brake system for automotive vehicles, the combination with brake mechanism for a pair of wheels of the vehicle and independent brake mechanism for another pair of wheels of the vehicle, an equalizing lever and rodding between the equalizing lever and said brake mechanisms, an operator operated part connected to operate said equalizing lever and the rodding connected therewith whereby all of said brake mechanisms may be operated simultaneously to distribute the power applied to said operator operated part to the respective brake mechanisms, and a safety connection from a point in said equalizing lever to a point fixed with respect to the vehicle, said connection providing a sufficient amount of lost motion to accommodate the normal movement of said equalizing lever.

26. In a brake system for automotive vehicles, the combination with brake mechanism for a pair of wheels of the vehicle and independent brake mechanism for another pair of wheels of the vehicle, an equalizing lever and rodding between the equalizing lever and said brake mechanisms, means for applying power to said equalizing lever and therethrough to said rodding whereby all of the brake mechanisms may be operated simultaneously and a safety connection from a point in said equalizing lever to a point fixed with respect to the vehicle, said connection providing a sufficient amount of lost motion to accommodate the normal movement of said equalizing lever.

27. In a brake system for automotive vehicles, the combination with brake mechanism for a pair of wheels of the vehicle and independent brake mechanism for another pair of wheels of the vehicle, an equalizing lever and rodding between the equalizing lever and said brake mechanisms, means for applying power to said equalizing lever and therethrough to said rodding whereby all of the brake mechanisms may be operated simultaneously and a safety connection from a point in said equalizing lever, between its points of connection with the rodding of the respective brake mechanisms to a point fixed with respect to the vehicle, said safety connection providing a sufficient amount of lost motion to accommodate the normal movement of the equalizing lever.

28. In a brake system for automotive vehicles, the combination with a brake mechanism for the steering wheels of the vehicle and independent brake mechainsm for non-steering wheels of the vehicle of an equalizing lever and rodding, extending therefrom to the brake mechanisms for the steering and non-steering wheel brake mechanisms, power applying means connected to said equalizing lever for operating the same and the rodding connected thereto to apply all of said brake mechanisms simultaneously and distributing the power of the power applying means between said respective brake mechanisms, and a safety connection from a point in said equalizing lever to a point fixed with respect to the vehicle, accommodating the normal movements of said lever, said safety connection operating in case of a rupture or disconnection of the rodding from said equalizing lever to certain brake mechanisms to make the other brake mechanisms operable by the power applying means.

29. In a brake mechanism for automotive vehicles, the combination with a pair of brake mechanisms for the steering wheels of the vehicle and a pair of independent brake mechaanisms for non-steering wheels of the vehicle, of an equalizing lever and rodding, extending therefrom to the brake mechanisms for the steering and non-steering wheel brake mechanisms, power applying means connected to said equalizing for operating the same and the rodding connected thereto to apply all of said brake mechanisms simultaneously and distributing the power of the power applying means between said respective pairs of brake mechanisms, and a safety connection from a point between its points of connection with the rodding of the independent brake mechanisms to a point fixed with respect to the vehicle, said safety connection operating in case of a rupture or disconnection of the rodding from said equalizing lever to certain brake mechanisms to make the other brake mechanisms operable by the power applying means.

In testimony whereof I affix my signature.

ALEXANDER A. AGUEEFF.